United States Patent [19]

Hougaard

[11] Patent Number: 4,868,604
[45] Date of Patent: Sep. 19, 1989

[54] DEVICE FOR ACHIEVING A SUBSTANTIALLY UNIFORM DISTRIBUTION OF THE LIGHT IN THE PICTURE PLANE OF A REPRODUCTION CAMERA

[75] Inventor: Finn Hougaard, Copenhagen, Denmark

[73] Assignee: Eskofot A/S, Ballerup, Denmark

[21] Appl. No.: 293,613

[22] Filed: Jan. 5, 1989

Related U.S. Application Data

[63] Continuation of Ser. No. 44,297, Apr. 30, 1987, abandoned.

[30] Foreign Application Priority Data

May 2, 1986 [DK] Denmark .............................. 2049/86

[51] Int. Cl.⁴ ............................................ G03B 27/72
[52] U.S. Cl. ...................................................... 355/71
[58] Field of Search ...................................... 355/67-71

[56] References Cited

U.S. PATENT DOCUMENTS 4,426,153  1/1984  Libby et al. .......................... 355/554

Primary Examiner—Richard A. Wintercorn
Attorney, Agent, or Firm—Cushman, Darby & Cushman

[57] ABSTRACT

A device for achieving a substantially uniform distribution of the light in the picture plane of a reproduction camera by providing a suitable distribution of the light in the original plane (8), whereby the desired distribution of the light in the original plane is obtained by means of illuminating means comprising adjustable screening members (12). According to the invention the screening members are adjusted by means of a computer in response to the desired enlargement. A light sensor adjacent the picture plane compensates automatically for the influence of the screening members on the main exposure.

10 Claims, 4 Drawing Sheets

DEVICE FOR ACHIEVING A SUBSTANTIALLY UNIFORM DISTRIBUTION OF THE LIGHT IN THE PICTURE PLANE OF A REPRODUCTION CAMERA

This is a continuation of application Ser. No. 07/044,297, filed Apr. 30, 1987, which was abandoned upon the filing hereof.

FIELD OF THE INVENTION

The invention relates to a device for achieving a substantially uniform distribution of the light in the picture plane of a reproduction camera by providing a suitable distribution of the light in the original plane, whereby the desired distribution of the light in the original plane is obtained by means of illuminating means comprising adjustable screening members.

BACKGROUND ART

A manual adjustment of the screening members allows a distribution of the light in the original plane which results in a substantially uniform distribution of the light in the picture plane. The adjustment of the screening members is for instance based on table references.

SUMMARY OF THE INVENTION

The present invention allows an automatic adjustment by means of a computer adjusting the screening members in response to the desired enlargement.

In this manner the device is easier to handle than the known devices as now only the desired enlargement need be entered.

BRIEF DESCRIPTION OF DRAWINGS

The invention will be described more detailed below with reference to the accompanying drawings, in which.

DESCRIPTION OF PREFERRED EMBODIMENTS

Figure 1:
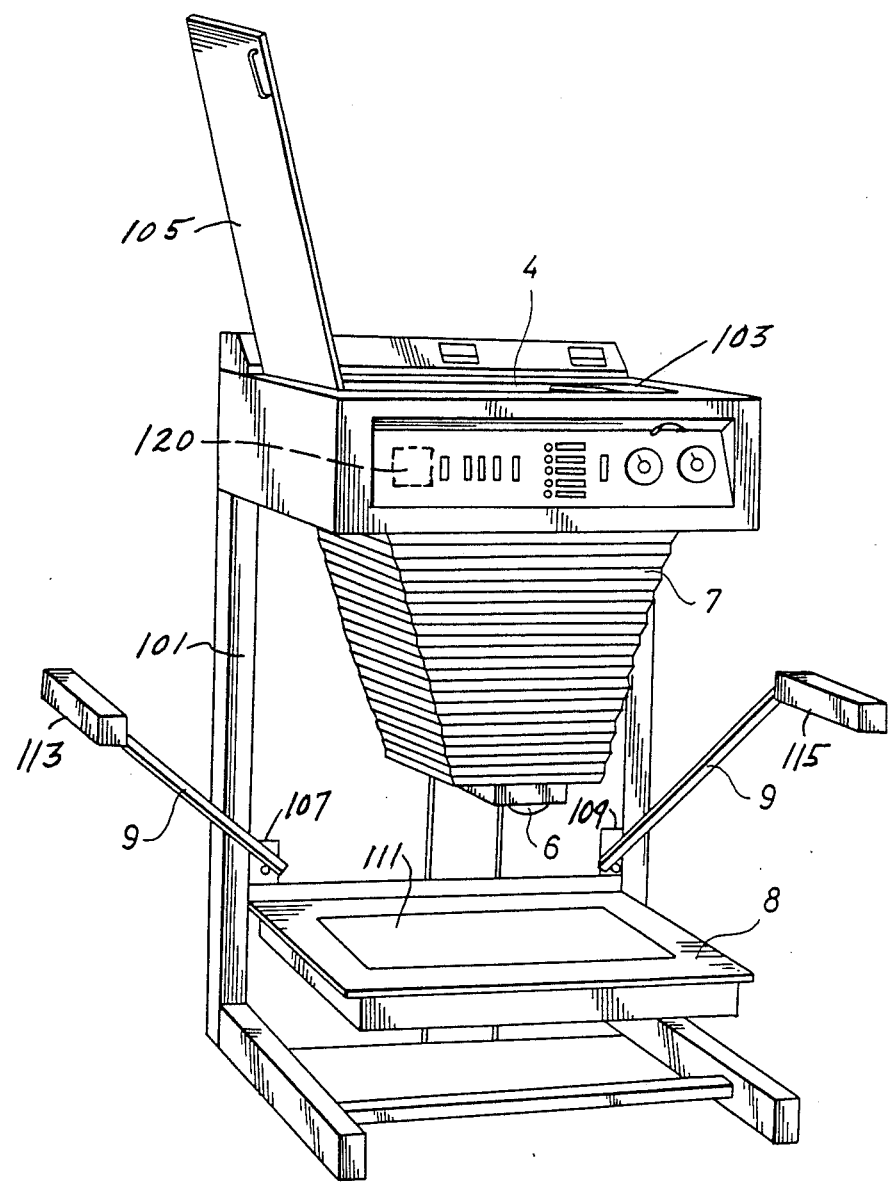
FIG. 1 illustrates a reproduction camera according to the invention.

FIG. 1 illustrates a reproduction camera comprising a frame 101. At the top of frame 101 is a permanent table 103 with a glass plate 4 for a sheet of light-sensitive material. A lid 105 can be situated on the glass plate 4 so as to secure the sheet. A photographic objective 6 is carried by an up- and downwardly displaceable bellows 7. A table 8 is provided below the objective 6, said table being mounted in two vertical guides 107 and 109 so as to be up- and downwardly displaceable, i.e. towards and away from the objective 6. The table 8 supports a glass plate 111 for the original. Some illuminating means 113 and 15 are situated on pivotal arms 9, said illuminating means exposing the original on the table 8.

Figure 2:
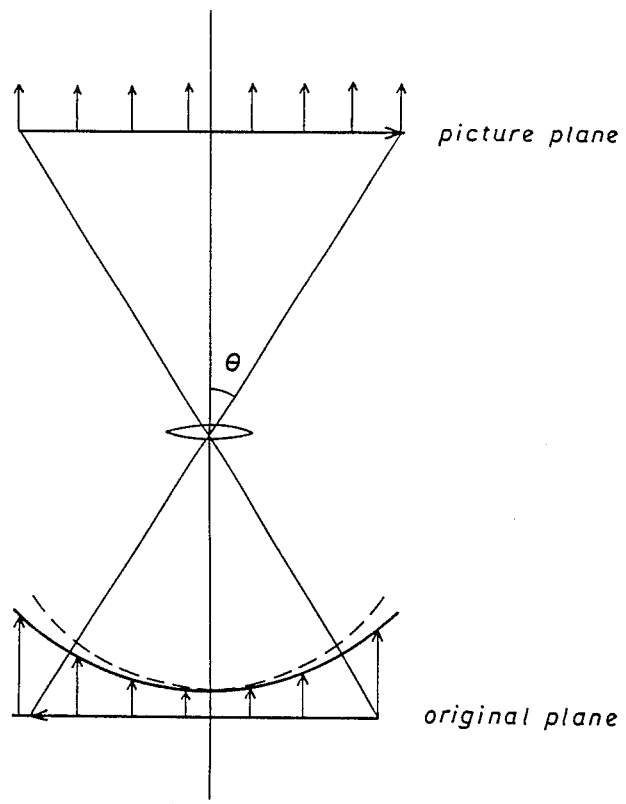
FIG. 2 illustrates the distribution of light in the picture plane and the original plane, respectively.
Figure 3:
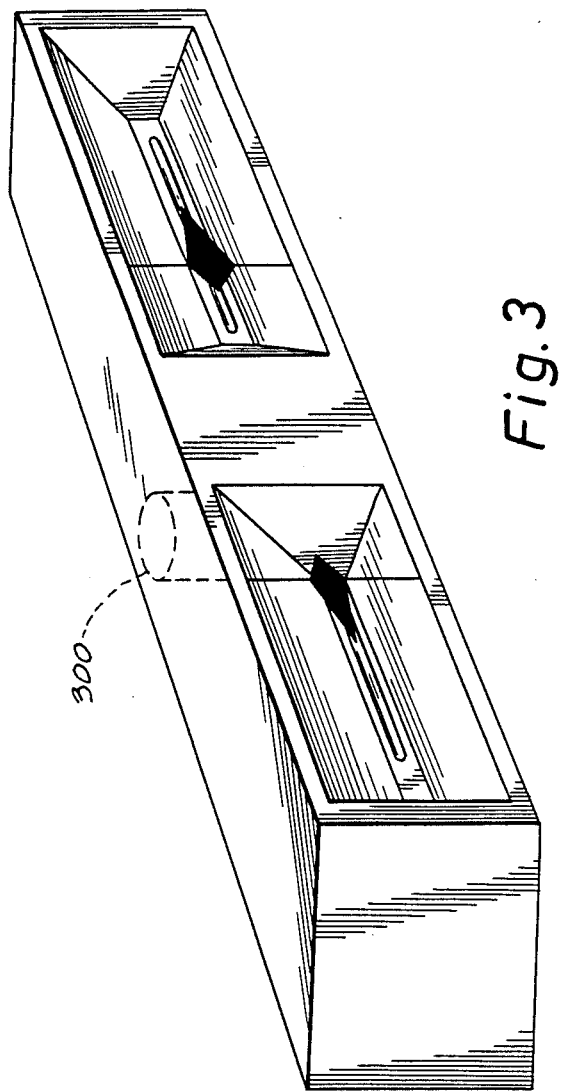
FIG. 3 illustrates one of the illuminating means.
Figure 4:
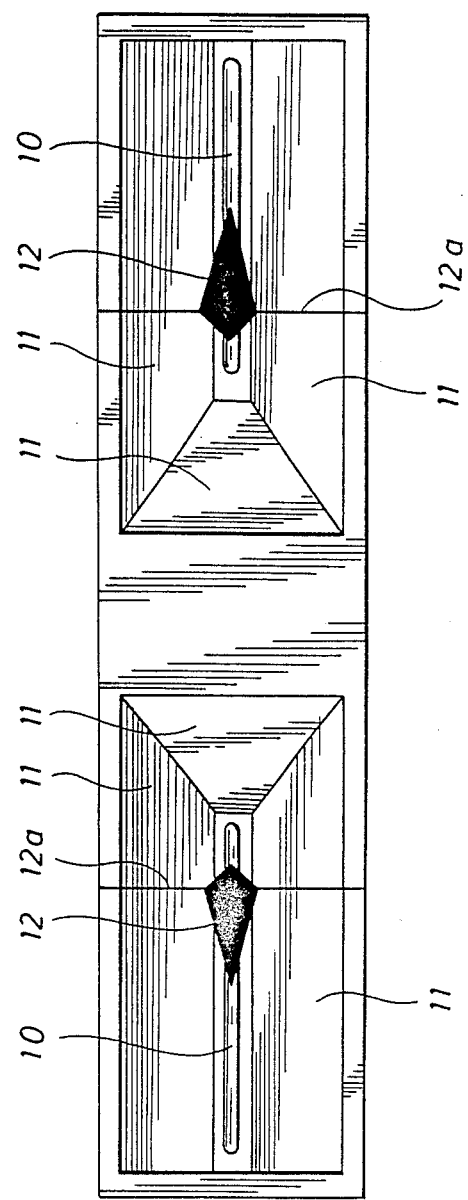
FIG. 4 is a front view of the illuminating means of FIG. 3.

The reflections at the objective cause a distribution of the light in the picture plane which depends on the distribution of light in the original plane multiplied with $COS^4 \theta$, cf. FIG. 2, wherein the arrows indicate the distribution of light in the picture plane and the original plane, respectively. In other words a very heterogeneous distribution of the light is provided. The distribution of light depends furthermore on the enlargement and the diaphragm. The present invention provides a compensation for the difference in the picture plane by means of a suitable distribution of light in the original plane. The latter is according to the invention achieved by means of illuminating means comprising oblong illuminating members 10 in connection with reflectors 11, adjustable screening members 12 being situated in front of the illuminating members. The screening members shield mostly for the side exposure and can be turned over an angular interval of about 90° about a shaft substantially transverse to the illuminating members. The screening members are secured to a shaft indicated at 12A and driven by motor 300. Each screening member is for instance kite-shaped (consisting of two isosceles triangles), as shown in FIG. 4. The inventor of the present invention has determined that an unambigous relation exists between the enlargement and the adjustment providing a substantially uniform distribution of light in the picture plane, This relation is advantageously being entered in a computer 120 included as part of front panel 20 of the top portion of frame 101. Subsequently, the computer 120 performs the necessary adjustment in response to the desired enlargement by means of the servomotor 300. This servomotor 300 is mounted within the illuminating means (as shown in FIG. 3) and communicates electrically with the computer 120 optionally situated behind the front panel 20.

FIG. 4 is a front view of each mirror-symmetric illuminating means, both the illuminating members 10 and the reflectors 11 therebehind appearing.

A light sensor adjacent the picture plane compensates automatically for the influence of the screening members on the main exposure. An example of such a light sensor with associated electronic control circuit is described in German patent specification No. 2,251,334.

The present invention provides thus a reproduction camera which is easier to handle than the previous cameras.

The above unambigous connection between the enlargement and the adjustment of the screening members is found by tests.

I claim:

1. A device for achieving a substantially uniform distribution of light in a picture plane of a reproduction camera by providing a suitable distribution of the light in a plane of an original, comprising:
   illuminating means for producing a desired distribution of the light in the original plane;
   a plurality of adjustable screening members, each of a four-sided shape formed by two isosceles triangles coupled to said illuminating means to adjustably screen the light produced by said illuminating means; and
   means for automatically adjusting a position of the screening members in response to a desired amount of enlargement.

2. A device as claimed in claim 1, wherein the means for automatically adjusting the screening members are formed by a computer.

3. A device as claimed in claim 1, further comprising a light sensor, adjacent the picture plane for detecting the influence of the screening members on the main exposure.

4. A device as claimed in claim 1, further comprising pivot means, coupled to the screening members, on which said members are turnable from a position substantially transverse to the illuminating means into a position substantially parallel to said illuminating means.

5. A device as claimed in claim 4, wherein the pivot means of each screening member communicates with a servomotor controlled by the computer.

6. A device for achieving a substantially uniform distribution of light in a picture plane of a reproduction camera by providing a suitable distribution of the light in a plane of an original, comprising:

illuminating means for producing a desired distribution of light in the original plane;

a plurality of adjustable screening members, formed so as to be able to screen for light to the center of the original table coupled to said illuminating means to adjustably screen the light produced by said illuminating means; and means for automatically adjusting a position of the screening members in response to a desired amount of enlargement.

7. A device as in claim 6 wherein said screening members are formed so as to cause said distribution of light in said picture plane to equal a distribution of light in an original plane multiplied by $COS^4 \theta$.

8. A device as in claim 7 wherein said members are each of a four-sided shape formed by two isosceles triangles.

9. A device for achieving a substantially uniform distribution of light in a picture plane of a reproduction camera by providing a suitable distribution of the light in a plane of an original, comprising:

illuminating means for producing a desired distribution of light in the original plane;

a plurality of adjustable screening members, each of a shape to adjustably screen the light produced by said illuminating means such that the center of the original table is screened more than edges thereof; and means for automatically adjusting a position of the screening members in response to a desired amount of enlargement.

10. A device as in claim 9 wherein said shape is such as to produce a distribution of light in the picture plane which depends on a distribution of light in an original plane multiplied by $COS^4 \theta$.

* * * * *